(12) United States Patent
Jatzke et al.

(10) Patent No.: US 11,827,163 B2
(45) Date of Patent: Nov. 28, 2023

(54) COVER FOR A PRESSURE-LIMITING VALVE ARRANGEMENT OF A VEHICLE, PRESSURE-LIMITING VALVE ARRANGEMENT, AND METHOD FOR PRODUCING A COVER FOR A PRESSURE-LIMITING VALVE ARRANGEMENT

(71) Applicant: ILLINOIS TOOL WORKS INC., Glenview, IL (US)

(72) Inventors: Stefan Jatzke, Eberstsheim (DE); Andreas Senn, Neuhemsbach (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 221 days.

(21) Appl. No.: 17/213,778

(22) Filed: Mar. 26, 2021

(65) Prior Publication Data
US 2021/0316674 A1 Oct. 14, 2021

(30) Foreign Application Priority Data
Apr. 9, 2020 (DE) ..................... 10 2020 110 004.3

(51) Int. Cl.
*B60R 13/08* (2006.01)
*B60H 1/24* (2006.01)

(52) U.S. Cl.
CPC ......... *B60R 13/0884* (2013.01); *B60H 1/249* (2013.01)

(58) Field of Classification Search
CPC ... B65D 11/1833; B65D 11/18; B65D 11/182; B60H 2001/006; B60H 1/249; B60R 13/0884

USPC ..................... 220/666; 454/70, 162; 229/406
See application file for complete search history.

(56) References Cited

U.S. PATENT DOCUMENTS

| | | | | | |
|---|---|---|---|---|---|
| 4,269,345 | A | * | 5/1981 | Emery | B65D 5/28 229/406 |
| 6,131,803 | A | * | 10/2000 | Oliff | B65D 71/36 229/117.12 |
| 7,328,814 | B2 | * | 2/2008 | Nordland | B65D 43/162 220/756 |
| 8,726,618 | B1 | * | 5/2014 | Laurita | B65D 21/086 206/520 |
| 11,273,950 | B2 | * | 3/2022 | Oliveira | B65D 5/10 |
| 2002/0157986 | A1 | * | 10/2002 | Bowers | B65D 5/4608 206/703 |

(Continued)

FOREIGN PATENT DOCUMENTS

| DE | 7810224 U1 | 9/1978 |
|---|---|---|
| DE | 3503600 A1 | 8/1986 |

(Continued)

*Primary Examiner* — Ko-Wei Lin
(74) *Attorney, Agent, or Firm* — THOMPSON HINE LLP (57) ABSTRACT

A cover (1) for a pressure-limiting valve arrangement of a vehicle, wherein the cover (1) has at least one side wall (2a, 2b, 2c), preferably at least two side walls, and has a wall region (3) serving as a lid region of the cover (1), wherein the cover (1) is transferable from a state of manufacture into a state of use, wherein, in the state of manufacture, the at least one side wall (2a, 2b, 2c) and the wall region (3) serving as a lid region are situated at least substantially and/or at least regionally in a common plane, and wherein, in the state of use, the at least one side wall (2a, 2b, 2c) and the wall region (3) serving as a lid region are situated in mutually different planes.

9 Claims, 9 Drawing Sheets

(56) References Cited

U.S. PATENT DOCUMENTS

| | | | |
|---|---|---|---|
| 2013/0161330 A1* | 6/2013 | Gualersi | B65D 25/04 |
| | | | 220/666 |
| 2015/0343965 A1* | 12/2015 | Rowland | B60R 13/0838 |
| | | | 454/165 |
| 2016/0039598 A1* | 2/2016 | Wilcox | B65D 25/005 |
| | | | 206/423 |
| 2016/0355296 A1* | 12/2016 | Baker | B65D 25/30 |
| 2018/0222625 A1* | 8/2018 | Perella | B65D 9/14 |
| 2018/0339837 A1* | 11/2018 | Fitt | B65D 25/00 |
| 2019/0256246 A1* | 8/2019 | Gilstrap | B65D 11/1833 |

FOREIGN PATENT DOCUMENTS

| | | |
|---|---|---|
| DE | 19910516 A1 | 9/2000 |
| DE | 202015102762 U1 | 7/2015 |

\* cited by examiner

*FIG. 1*

*(Prior Art)*

COVER FOR A PRESSURE-LIMITING VALVE ARRANGEMENT OF A VEHICLE, PRESSURE-LIMITING VALVE ARRANGEMENT, AND METHOD FOR PRODUCING A COVER FOR A PRESSURE-LIMITING VALVE ARRANGEMENT

The present invention relates in general to ventilation devices for the interior of vehicles, wherein such ventilation devices are herein also referred to as "pressure-limiting valve arrangements".

BACKGROUND

Ventilation devices or pressure-limiting valve arrangements for the interior of vehicles generally have a frame which surrounds a ventilation opening and on which at least one flap which covers the ventilation opening and which can be pivoted away rests on the outer side.

A pressure-limiting valve arrangement of the type under consideration herein has in particular at least one pressure-limiting valve and/or at least one valve flap, wherein the at least one pressure-limiting valve and/or the at least one valve flap is preferably held in a frame.

Such ventilation devices or pressure-limiting arrangements are generally known in various embodiments.

By way of example, reference should be made in this document DE 35 03 600 A1. In the case of the pressure-limiting valve arrangement known from this prior art, an airflow can pass from the vehicle interior to the outside via the ventilation opening, specifically by said airflow lifting the at least one flap of the pressure-limiting valve arrangement from the frame because of arising pressure conditions. By contrast, the penetration of ambient air into the vehicle interior is successfully prevented by the flap which then rests on the frame.

Accordingly, pressure-limiting valve arrangements of the type under consideration herein serve to dissipate building-up of the air pressure in the vehicle interior, for example when a tailgate of the vehicle is closed. The pressure-limiting valve, which is generally configured as a flap, can open when there is an increased air pressure in the interior of the vehicle, in order to allow air in the interior to escape, as a result of which the air pressure in the interior of the vehicle is dissipated and, for example, the effort for closing the tailgate is reduced.

Furthermore, a vehicle with a pressure-limiting valve arrangement can influence the airflow from the vehicle passenger compartment in order to increase the passenger comfort. Since an air conditioning system sucks up ambient air from outside the vehicle, and introduces the air into the vehicle passenger compartment, venting by means of the pressure-limiting valve arrangement is required in order to achieve proper circulation and to dissipate the buildup of pressure.

However, when the pressure-limiting valve belonging to the pressure-limiting valve arrangement is opened, noise can penetrate through the opening from the outside. In order to reduce the penetration of noise and external elements into the vehicle passenger compartment, pressure-limiting valves can be embodied to be as small as possible, but this limits the speed at which pressure can be compensated for with the aid of the pressure-limiting valve arrangement.

As an alternative thereto, in order to reduce the noise when pressure is being compensated for with the aid of the pressure-limiting valve arrangement, it is conceivable to provide the pressure-limiting valve arrangement with a type of "silencer". For this purpose, it is known to place a cover onto the pressure-limiting valve arrangement in order thereby to form a silencer space, wherein, when the pressure-limiting valve arrangement is opened, a flow path between the vehicle interior and the external atmosphere runs at least regionally through the silencer space.

However, the manufacturing of covers, which serve as a silencer space, for pressure-limiting valve arrangements is relatively complicated since the cover is a three-dimensional structure which is generally embodied as an injection molded component, wherein the inner walls of the three-dimensional cover have to be provided with corresponding sound absorption materials in a separate working step. Said working step is generally undertaken at manufacturing stations which differ from the manufacturing stations in which the housing of the cover is manufactured and in particular injection molded. As a result, for the manufacturing of the cover, in particular the outlay on installation and the installation costs and thus the overall costs for manufacturing the cover are increased.

SUMMARY

On the basis of this problem, the present invention addresses the problem of specifying a cover for a pressure-limiting valve arrangement of a vehicle, wherein the cover can be manufactured with a lower outlay and in particular particularly cost-effectively.

Furthermore, the intention is to specify a corresponding method for producing such a cover for a pressure-limiting valve arrangement of a vehicle.

Accordingly, the invention relates in particular to a cover for a pressure-limiting valve arrangement of a vehicle, wherein the cover has at least one and preferably at least two (or else more) side walls, and a wall region serving as a lid region of the cover. The cover is transferable from a state of manufacture, i.e. a state in which the cover is manufactured, into a state of use, wherein, in the state of manufacture, the at least one side wall and the wall region serving as a lid region are situated at least substantially and/or at least regionally in a common plane. In the state of use, i.e. when the cover is connected to the pressure-limiting valve arrangement, the at least one side wall and the wall region serving as a lid region are, by contrast, situated in mutually different planes.

The advantages which can be achieved with the solution according to the invention are obvious: in particular, the present invention makes it possible for a cover for a pressure-limiting valve arrangement to be completely manufactured preferably in a single working step or at least in a single working station. This simplifies the entire manufacturing sequence, and various processing steps in various stations can be dispensed with. This results in a manufacturing process which is considerably reduced with regard to the outlay and the costs.

In particular, it is possible in this connection that, for the production of the cover according to the invention, first of all an at least substantially flat structure consisting of the at least one side wall and preferably the at least two (or more) side walls, and the wall region serving as a lid region, is provided preferably as an at least substantially flat injection molded component, wherein, subsequently, said at least substantially flat structure can be equipped with a sound absorption material, in particular in an automated manner. Subsequently, then, the at least substantially flat structure is folded to form a three-dimensional shape or brought together in some other way to form a three-dimensional shape which, in the state of use of the cover, constitutes at least regionally a three-dimensional silencer space for the pressure-limiting valve arrangement.

In particular, it is thus provided that, in the state of use of the cover, the at least one side wall and the wall region serving as a lid region at least regionally delimit a three-dimensional silencer space for the pressure-limiting valve arrangement.

The at least one side wall and the wall region serving as a lid region each have a first surface, which, in the state of manufacture of the cover, face in a common direction, that preferably points perpendicularly to the common plane. Of course, the invention is not restricted to embodiments in which the at least one side wall and the wall region serving as a lid region each have a first surface, which, in the state of manufacture of the cover, face in a direction that preferably points perpendicularly to the common plane. On the contrary, the invention also relates to embodiments in which the at least one side wall and the wall region serving as a lid region each have a first surface, which, in the state of manufacture of the cover, are provided at a slight inclination.

In particular, however, the first surface of the at least one side wall and the first surface of the wall region serving as a lid region, in the state of use of the cover, at least regionally form an inner surface of the three-dimensional silencer space.

For optimum sound absorption, it is provided in particular that a suitable sound absorption material is arranged at least regionally on the first surface of the at least one side wall and/or on the first surface of the wall region serving as a lid region. This in particular involves a porous material, for example rock wool, glass wool or glass fibers, wherein said sound absorption material partially absorbs sound energy, i.e. converts the latter into heat. The effect of the sound absorption is preferably amplified by multiple reflection.

According to realizations of the cover according to the invention, it is provided in this connection that a nonwoven material, for example composed of mineral wool, is used as the sound absorption material. Of course, however, other embodiments are also suitable here for the sound absorption material.

In order to simplify the arranging of the sound absorption material on the first surface of the at least one side wall and/or the first surface of the wall region serving as a lid region, it is provided, according to embodiments of the cover according to the invention, that, for the purpose of at least temporarily fixing the sound absorption material on the corresponding surface of the at least one side wall and/or of the wall region serving as a lid region, at least one connection element, preferably serving as a snap-action and/or latching connection element, is provided on the first surface of the at least one side wall and/or on the first surface of the wall region serving as a lid region.

For example, it is conceivable, for the manufacturing of the cover according to the invention, for the sound absorption material to be initially temporarily fixed on the corresponding regions of the provided at least substantially flat structure, consisting of the at least one side wall and the wall region serving as a cover region, with the aid, for example, of a snap-action and/or latching connection, wherein, subsequently, the sound absorption material is preferably permanently fixed in an automated manner to the corresponding surface region of the at least one side wall and/or of the wall region serving as a lid region. However, instead of a snap-action and/or latching connection, materially bonded connections (for example welded connections or adhesive connections) are also conceivable in order to at least temporarily fix the sound absorption material on the corresponding regions of the provided at least substantially flat structure consisting of the at least one side wall and the wall region serving as a lid region.

Expressed in general terms, different solutions are suitable for fixing the sound absorption material on the corresponding surface of the at least one side wall and/or on the corresponding surface of the wall region serving as a lid region. In particular, at least one materially bonded, form-fitting and/or force-fitting connection is appropriate here.

According to embodiments, the sound absorption material is connected to the corresponding surface region of the at least one side wall and/or to the corresponding surface region of the wall region serving as a lid region with the aid of a spot-welding system which correspondingly travels, preferably in an automated manner, over the at least one substantially flat structure (injection molded component) consisting of the at least one side wall and the wall region serving as a lid region.

Of course, other solutions for fixing the sound absorption material on the surface of the at least one side wall and/or the surface of the wall region serving as a lid region are also suitable.

In order firstly to reduce the weight of the cover and the outlay on material but secondly to retain the necessary stability of the cover, in particular in the state of use thereof, it is provided, according to embodiments of the cover according to the invention, that a corresponding partition is formed in particular on the (second) surface opposite the first surface of the at least one side wall and/or in particular on the (second) surface opposite the first surface of the wall region serving as a lid region. Said partition is preferably formed with the aid of at least one web region which is formed preferably integrally with the material of the at least one side wall and/or with the material of the wall region serving as a lid region.

A partition formed via at least one web region optimizes the flexural rigidity and torsional rigidity of the side walls and/or wall regions of the cover while simultaneously reducing the amount of material.

In a preferred manner, the at least one side wall of the cover is articulately connected to the wall region serving as a lid region in particular via a hinge, preferably film hinge. In particular, it is of advantage in this connection that the at least one side wall, the at least one hinge and the wall region serving as a lid region are formed integrally during a plastic injection molding process.

According to a further aspect of the present invention, it is provided that the cover has at least two side walls, wherein each side wall of the at least two side walls is, in each case via an edge region, articulate the connected to an edge region of the wall region serving as a lid region. In particular, it is provided in this connection that, on a first edge region of a first side wall of the at least two side walls, which first edge region, in the state of use of the cover, directly adjoins a second edge region of a second side wall of the at least two side walls, there is formed at least one first snap-action or latching element, which is formed at least regionally in a manner complementary with respect to a second snap-action or latching element, which is formed in an adjoining manner on the second edge region of the second side wall of the at least two side walls, which second edge region, in the state of use of the cover, directly adjoins the first edge region of the first side wall of the at least two side walls.

This measure which is particularly easy to realize but is nevertheless effective makes it possible to secure the corresponding side walls and wall regions of the cover relative to one another, in the state of use of the cover, and to at least temporarily fix them.

In particular in a development of the last-mentioned embodiment, it is provided, in an advantageous manner, that, on an edge region of the at least one side wall, which edge region, in the state of use of the cover, faces in a direction away from the wall region serving as a lid region, there is formed at least one snap-action and/or latching element in order to connect the cover, when the latter is in its state of use, to a pressure-limiting valve arrangement and, in particular to an edge region or frame region of a pressure-limiting valve arrangement, which is preferably formed as a ventilation grille arrangement.

The invention furthermore relates to a pressure-limiting valve arrangement for vehicles, wherein the pressure-limiting valve arrangement has at least one ventilation grille having at least one valve flap held in a frame, and has a cover of the previously described type according to the invention. It is provided in particular here that the cover is present in its state of use. Furthermore, it is provided in particular that the cover is connected to the ventilation grill, and preferably to the frame of the ventilation grille, preferably via at least one snap-action and/or latching connection via its at least one side wall.

Finally, the invention relates to a method for producing a cover for a pressure-limiting valve arrangement of a vehicle, wherein the method comprises the following method steps:
  providing an at least substantially flat injection molded component consisting of at least one side wall, and preferably at least two side walls, and of a wall region serving as a lid region;
  at least regionally applying and/or fixing a sound absorption material to a first surface of the at least one side wall and/or of the wall region serving as a lid region; and
  transferring the at least substantially flat injection molded component into a three-dimensional shape which at least regionally constitutes a three-dimensional silencer space.

According to a further aspect, the invention furthermore relates to an optimized method for producing a cover for a pressure-limiting valve arrangement of a vehicle, wherein, in a first method step, a housing of the cover is provided, and, in a second method step, a sound absorption material is at least regionally applied and/or fixed to an inner surface of the housing. The housing here is preferably in the form of an injection molded component and consists of at least one side wall, and preferably at least two side walls, and of a wall region serving as a lid region. In particular, it is provided in this connection that the provided housing of the cover has a shape/shaping which at least regionally constitutes a multi-dimensional, and in particular three-dimensional, silencer space.

During the method step of applying and/or fixing the sound absorption material to the inner surface of the housing, the sound absorption material is in particular transferred from an originally at least substantially flat shape into a shape which at least regionally corresponds to a shaping predefined by the inner surface of the housing.

In the case of the production method of the previously mentioned type, in particular the method step of applying and/or fixing the sound absorption material to the inner surface of the housing comprises the following method steps:

providing the sound absorption material in an at least substantially flat form, wherein the outline of the sound absorption material provided corresponds to the network of the regions of the inner surface of the housing that are to be covered by the sound absorption material;
  dressing a pressing punch with the sound absorption material provided, wherein, for dressing the pressing punch, the sound absorption material provided is placed at least regionally on an end surface of the pressing punch, and wherein the pressing punch has an end surface which is matched to the size and/or shaping of the wall region serving as a lid region; and
  introducing the dressed pressing punch into the provided housing of the cover, specifically in such a way that the sound absorption material placed at least regionally on the end surface of the pressure punch is deformed at least partially or regionally and at least regionally bears on the inner surface of the housing.

In particular, in this development of the production method according to the invention, it is provided that, with the introduction of the dressed pressing punch into the provided housing of the cover, the at least partially or regionally deformed sound absorption material is fixed at least regionally to the inner surface of the housing.

The fixing takes place preferably with the aid of snap-action or latching elements which are provided on the inner surface of the housing. Alternatively or additionally to such a form-fitting fixing, a force-fitting or materially bonded fixing of the sound absorption material to the inner surface of the housing is, of course, also conceivable. In particular, such fixing can be carried out with the aid of spot welding. Of course, however, other embodiments are also suitable here for fixing the at least partially or regionally deformed sound absorption material to the inner surface of the housing.

According to advantageous realizations of the production method according to the invention of the previously mentioned type, it is provided that the housing of the cover is provided by the housing of the cover being placed in a die-like device.

It is appropriate here that, after the method step of introducing the dressed pressing punch into the provided housing of the cover, the pressing punch is withdrawn again from the die-like device in which the housing of the cover is placed.

In a particularly preferred manner, the pressing punch here has been dressed with the sound absorption material provided, and, with the introduction of the thus dressed pressing punch into the housing of the cover that is provided in the die-like device, the at least partially or regionally deformed sound absorption material is fixed at least regionally to the inner surface of the housing, in such a way that, with the withdrawal of the pressing punch from the die-like device, the housing of the cover with the at least partially or regionally deformed sound absorption material, which is fixed at least regionally to the inner surface of the housing, is, together with the pressing punch, withdrawn from the die-like device.

The advantages which can be achieved with this production method according to the invention can be seen in particular in the fact that, during the production of the sound-insulating cover, all of the method and installation steps required for this purpose can be carried out in or at one and the same station. It is thus no longer required for the housing to be brought to a different workstation, for example for the application of the sound absorption material. As a result, the costs for manufacturing the sound-insulating cover according to the invention can be reduced.

In particular, the production method according to the invention permits automation since all of the method steps necessary for producing the sound-insulating cover can be carried out in an automated manner. This in turn reduces not only the production costs but also leads to smaller deviations in particular in respect of the appropriate shape during the production of the sound-insulating cover according to the invention.

BRIEF DESCRIPTION OF THE DRAWINGS

The invention also relates to a cover which has been produced according to the previously described method.

The invention will be described in more detail below with reference to the exemplary embodiments of the cover according to the invention and of the production method according to the invention that are shown in the drawings, in which.

DETAILED DESCRIPTION

In order to dissipate the buildup of the air pressure in the interior of a vehicle during the closing, for example, of the tailgate, a vehicle can be provided with an opening and with a pressure-limiting valve located in the opening. The pressure-limiting valve can open when there is increased air pressure in the interior of the vehicle, in order to allow air in the interior to escape, as a result of which the air pressure in the interior of the vehicle is dissipated and the effort for closing the tailgate is reduced.

Furthermore, a vehicle with a pressure-limiting valve can influence the airflow from the vehicle passenger compartment in order to increase the passenger comfort. Since an air conditioning system sucks up ambient air from outside the vehicle and the air is introduced into the vehicle passenger compartment, venting by means of the pressure-limiting valve is required in order to achieve proper circulation and to dissipate the buildup of pressure in the passenger compartment.

Since, when a pressure-limiting valve is opened, noise can penetrate from the outside through the opening, it is known in general from the prior art to assign a cover 10 serving as a sound-insulating space (silencer space) to the pressure-limiting valve.

Figure 1:
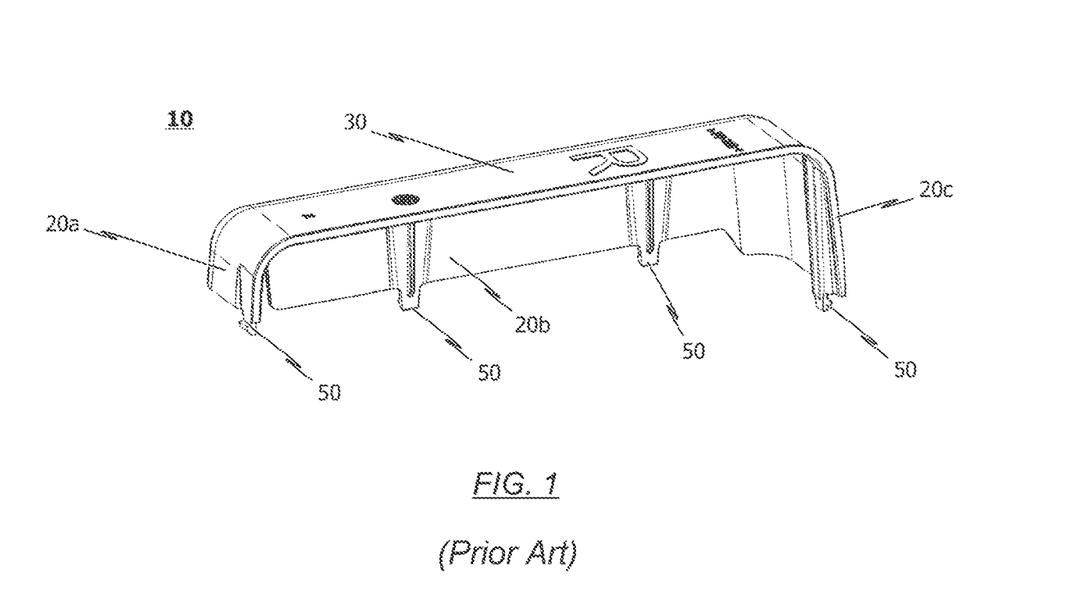
FIG. 1 shows, schematically and in an isometric view, a cover, which is known from the prior art, for a pressure-limiting valve arrangement of a vehicle.

An embodiment of a cover 10, which is known from the prior art, for a pressure-limiting valve arrangement is shown, schematically and in an isometric view, in FIG. 1.

The cover 10 which is known in general from this prior art has an overall three-dimensionally formed configuration which is formed by a multiplicity of side walls 20a, 20b, 20c and a wall region 30 serving as a lid region. Latching or snap-action connection elements 50 are provided on corresponding edge regions of the side walls 20a, 20b, 20c, which regions point away from the wall region 30 serving as a lid region, and enable the cover 10 to be connected to the frame of a pressure-limiting valve arrangement via a latching connection.

In order to reduce the sound as efficiently as possible, a sound absorption material (not shown in FIG. 1) generally in the form of at least one nonwoven mat or similar sound-insulating material is customarily arranged on the respective inner surfaces of the cover 10.

However, the manufacturing of a conventional cover 10 which is known from the prior art and as is illustrated, for example, in FIG. 1 requires at least two process steps which have to be carried out separately from one another and can be automated only with a relatively high outlay, if at all. In a first process step, the three-dimensional configuration of the cover 10 has to be manufactured, which conventionally takes place in an automated manner within the scope of a plastic injection molding process.

The attaching of a sound absorption material to the inner surfaces of the cover 10 is, however, relatively complicated and generally takes place manually since the three-dimensional configuration of the cover 10 means that conventionally usable automation techniques cannot be used or can be used only with a relatively great outlay.

In order to solve this problem, a cover 1 is proposed according to the invention which can be manufactured as a substantially flat injection molded component in one and the same system to an extent such that all the features necessary for the functioning of the cover 1 in the state of use are already formed in the same installation. This applies in particular to the application of sound absorption material 4 to the inner surface of the walls 2a, 2b, 2c, 3 forming the cover 1.

Subsequently, the three-dimensional configuration of the cover 1 is formed—preferably in the form of folding operations.

Figure 2:
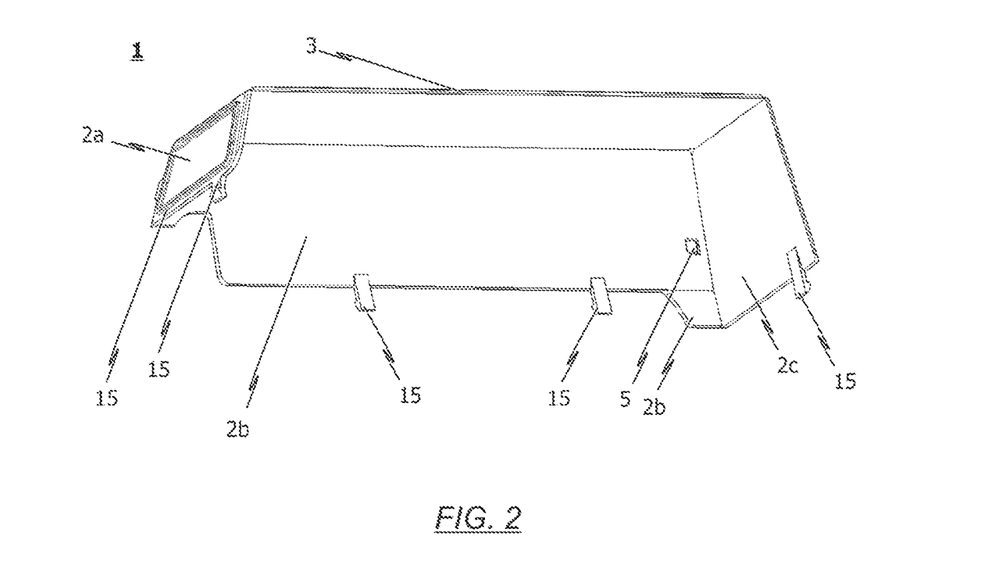
FIG. 2 shows, schematically and in an isometric view, an exemplary embodiment of the cover according to the invention for a pressure-limiting valve arrangement of a vehicle, wherein the cover is present in its state of use.

FIG. 2 shows, schematically and in an isometric view, an exemplary embodiment of the cover 1 according to the invention in its state of use.

The exemplary embodiment of the cover 1 according to the invention has a total of three sides walls 2a, 2b, 2c and a wall region 3 serving as a lid region of the cover 1. The side walls 2a, 2b, 2c and the wall region 3 serving as a lid region of the cover 1 are present in planes different form one another in the state of use shown in FIG. 2.

As will be described below with reference to the illustrations in FIG. 3A, FIG. 3B and FIG. 4, the corresponding side walls 2a, 2b, 2c and the wall region 3 serving as a lid region of the cover 1 are present, however, in the state of manufacture has an at least substantially flat component (injection molded component) in a preferably (substantially) common plane.

Like the cover 10 which is known from the prior art according to FIG. 1, the exemplary embodiment of the cover 1 according to the invention according to FIG. 2 is provided with a corresponding sound absorption material 4 on the inner side.

The production method of the cover 1 according to the invention will be described in more detail below with reference to the illustrations in FIG. 3A to FIG. 6.

Figure 3A:
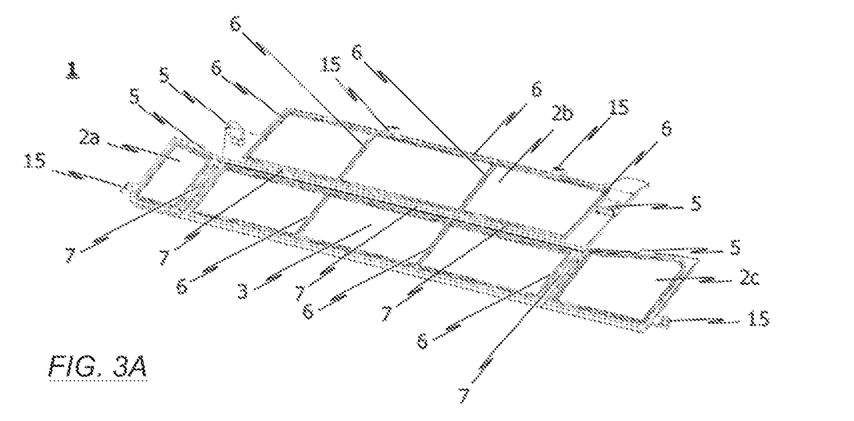
FIG. 3A shows, schematically, an isometric view of the second surfaces, opposite the first surfaces of the side walls, and of the second surface, opposite the first surface of the wall region serving as a lid region, of the exemplary embodiment of the cover according to the invention according to FIG. 2, but in the state of manufacture of the cover.
Figure 4:
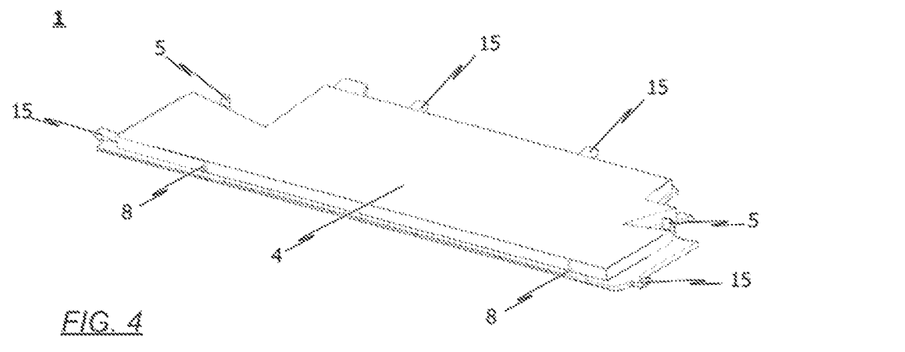
FIG. 4 shows, schematically and in an isometric view, the exemplary embodiment of the cover according to the invention according to FIG. 3B with the sound absorption material applied to the first surface of the side walls and to the first surface of the wall region serving as a lid region.

Specifically, and as is shown schematically and in an isometric view in FIG. 3A, during the manufacturing of the cover 1 according to the invention, in a first step, an at least substantially flat component (injection molded component) consisting of the side walls (here: the three side walls 2a, 2b, 2c) and the region 3 serving as a cover region is provided.

Each side wall 2a, 2b, 2c is in each case articulatedly connected via an edge region to an adjacent edge region of the wall region 3 serving as a lid region.

For the articulated connection of the side walls 2a, 2b, 2c to the wall region 3 serving as a lid region, use is preferably made in each case of a film hinge arrangement 7.

The component shown in FIG. 3A is preferably formed integrally during an injection molding process.

A partition is formed with the aid of corresponding webs 6 on the surface, visible in FIG. 3A, of the side walls 2a, 2b, 2c and/or of the wall region 3 serving as a lid region, in order, despite saving on material, to design the side walls 2a, 2b, 2c and/or the wall region 3 serving as a lid region to be torsion proof and flexurally rigid.

Furthermore, snap-action or latching elements 5 are formed on edge regions of the side walls 2a, 2b, 2c, which edge regions are not connected articulatedly to the wall region 3 serving as a lid region, said snap-action or latching elements serving, in the state of use of the cover 1 (cf. FIG. 2 of FIG. 6) to fix the side walls 2a, 2b, 2c of the cover 1 to one another.

Figure 7A:
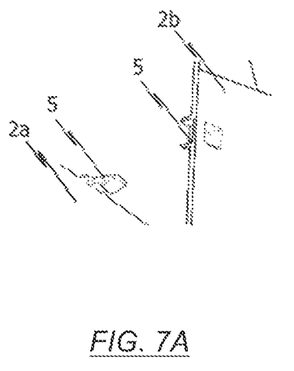
FIG. 7A shows, schematically and in an isometric view, a latching element arrangement on corresponding edge regions of mutually adjacent side walls of the exemplary embodiment of the cover according to the invention, specifically before formation of a latching connection.
Figure 7B:
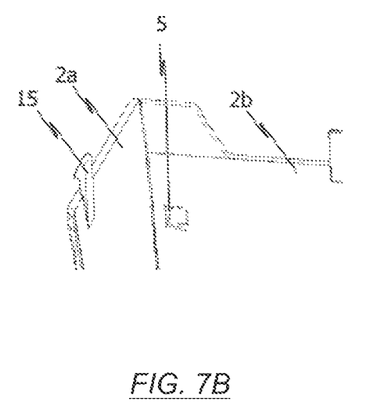
FIG. 7B shows, schematically and in an isometric view, the latching element arrangement according to FIG. 7A in the latched state.
Figure 8A:
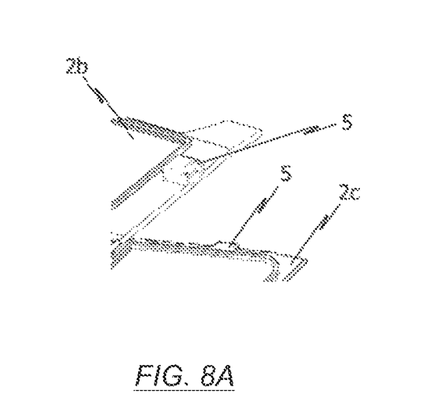
FIG. 8A shows, schematically and in an isometric view, a latching element arrangement on corresponding edge regions of mutually adjacent side walls of the exemplary embodiment of the cover according to the invention, specifically before formation of a latching connection.
Figure 8B:
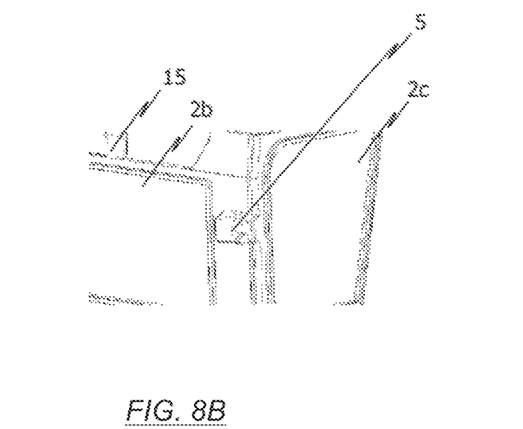
FIG. 8B shows, schematically and in an isometric view, the latching element arrangement according to FIG. 8A in the latched state.

Embodiments of suitable snap-action or latching elements 5 are shown in FIG. 7A (in the non-latched state) and in FIG. 7B (in the latched state) and in FIG. 8A (in the non-latched state) and in FIG. 8B (in the latched state).

Figure 3B:
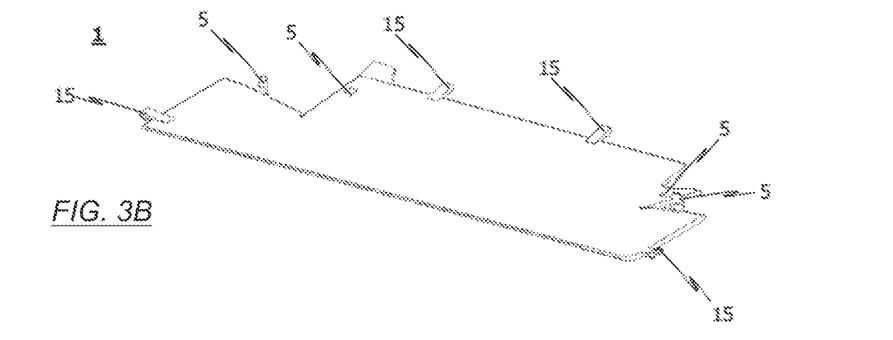
FIG. 3B shows, schematically, and in an isometric view of the first surfaces of the side walls and of the wall region serving as a lid region of the exemplary embodiment of the cover according to the invention according to FIG. 2, but in the state of manufacture of the cover.

FIG. 3B shows the at least substantially flat component according to FIG. 3A from the rear side (i.e. looking at the first surface of the side walls 2a, 2b, 2c and of the wall region 3 serving as a lid region).

After the substantially flat component according to FIG. 3A is provided, a sound absorption material 4 is applied to the first surface of the side walls 2a, 2b, 2c and to the first surface of the wall region 3 serving as a lid region.

This preferably takes place by fixing a nonwoven material made of sound absorption material 4, said nonwoven material being adapted to the contour of the at least substantially flat component according to FIG. 3A, wherein, in the region of the film hinges 7, the nonwoven material can be provided with corresponding notches 8 in order to facilitate the subsequent folding up of the wall regions 2a, 2b, 2c. Notches 8 of this type are recommended in particular if the sound absorption material 4 is not sufficiently flexible in order, during the subsequent folding operation, to form as neat a folding edge as possible.

Various embodiments are suitable for fixing the sound absorption material 4 to the first surface of the side walls 2a, 2b, 2c and/or to the first surface of the wall region 3 serving as a lid region. For example, it is conceivable for the nonwoven material to be fixed initially temporarily with the aid of a snap-action or latching connection, wherein subsequently, and preferably in an automated manner, for example with the aid of a spot-welding installation, the final fixing of the sound absorption material 4 to the first surface of the at least substantially flat component takes place.

Figure 5:
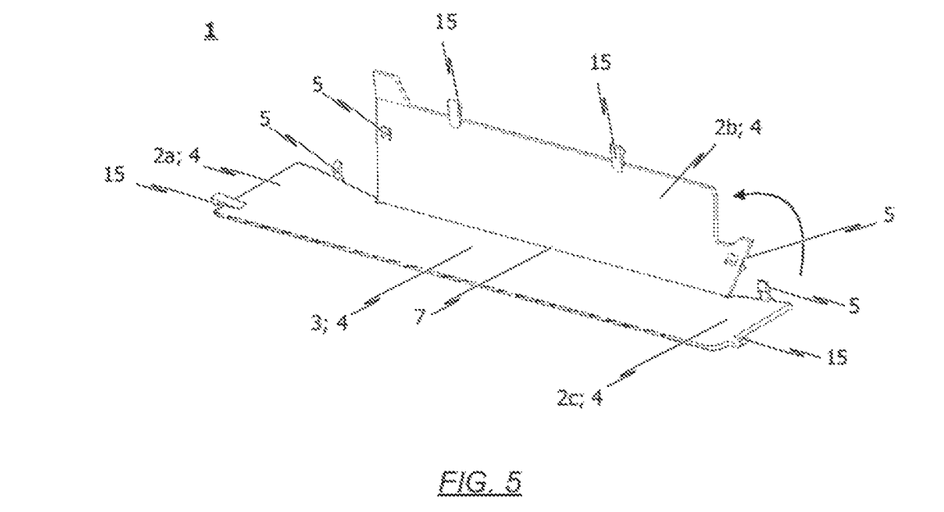
FIG. 5 shows, schematically and in an isometric view, the cover according to FIG. 4 during its transfer into its state of use.
Figure 6:
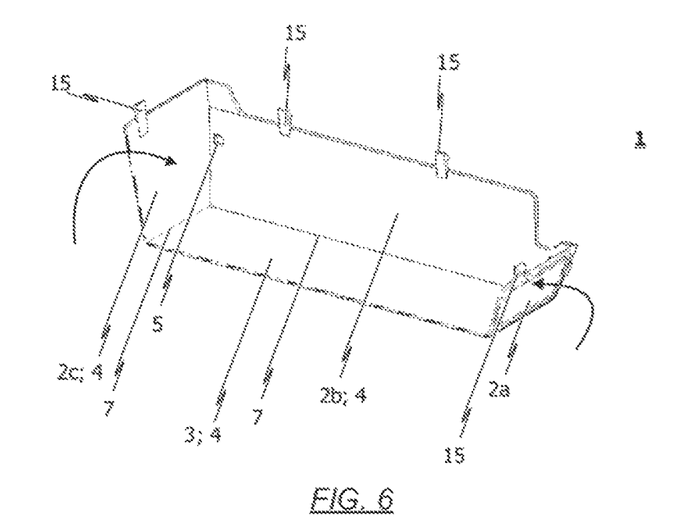
FIG. 6 shows, schematically and in an isometric view, the exemplary embodiment of the cover according to the invention according to FIG. 4 in its transferred state of use.

After the application of the sound absorption material 4 to the first surface of the at least substantially flat component according to FIG. 3B, the individual side walls 2a, 2b, 2c are pivoted or folded relative to the wall region 3 serving as a lid region of the cover 1 and are at least pre-fixed to one another with the aid of the snap-action or latching elements 5 provided on the corresponding edge regions, as is shown by way of example in FIG. 5 and FIG. 6.

In particular for transportation of the cover 1 or for storage of the cover 1, subsequent fixing in addition to the pre-fixing may possibly be desired. Such subsequent fixing can take place, for example, using a welding or adhesive bonding process. Of course, it is also conceivable in this connection for the cover to be stabilized in some other manner.

In particular, it should be emphasized in this connection that a pre-fixing of the side walls 2a, 2b, 2c to one another and/or to the wall region 3 serving as a lid region of the cover 1 with the aid of snap-action or latching elements 5 is not absolutely necessary. A corresponding pre-fixing is purely optional and can thus also be dispensed with here. A pre-fixing—should this be desirable—can also take place in some other way than with snap-action or latching elements 5, for example with the aid of a latching, adhesive bonding and/or welding connection.

In particular, it is preferred that the fixing of the side walls 2a, 2b, 2c to one another and/or to the wall region 3 serving as a lid region of the cover 1, and the necessary stability of said multi-dimensional form is ultimately achieved by assembling the cover 1 with preferably the frame of a corresponding pressure-limiting valve arrangement.

It should furthermore be emphasized in this connection that the formation of the multi-dimensional cover 1 does not depend on the sequence of folding operations shown in FIG. 5 and FIG. 6.

An alternative production method for producing the cover according to the invention will be described below with reference to FIG. 9 to FIG. 14.

During this production method, first of all a housing 9 of the cover 1 is provided, wherein the housing 9 is preferably embodied as an injection molded component and is composed of at least one side wall 2a, 2b, 2c and preferably at last two side walls, and a wall region 3 serving as a lid region.

Figure 9:
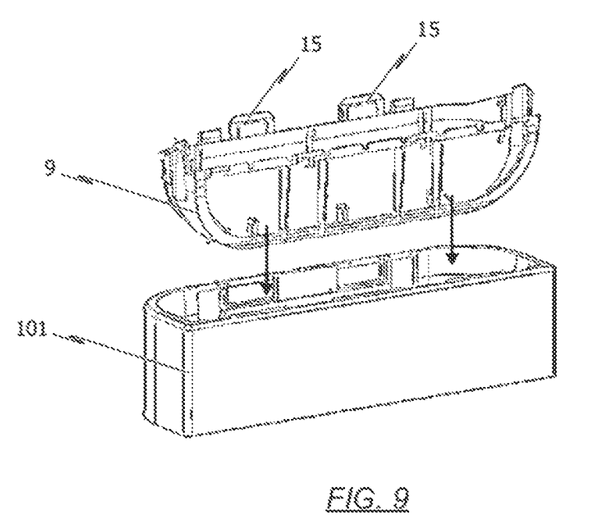
FIG. 9 shows, schematically and in an isometric view, a first method step of an exemplary embodiment of the method according to the invention for manufacturing the cover according to the invention, wherein, in the first method step, a housing of the cover is provided by said housing being placed into a die-like device.

As schematically illustrated in FIG. 9, said housing 9, which has a shape which at least regionally constitutes a multi-dimensional silencer space, is placed into a suitable die-like device 101.

Subsequently, a sound absorption material 4 is applied and/or fixed at least regionally to an inner surface of the previously provided housing 9.

Figure 11A:
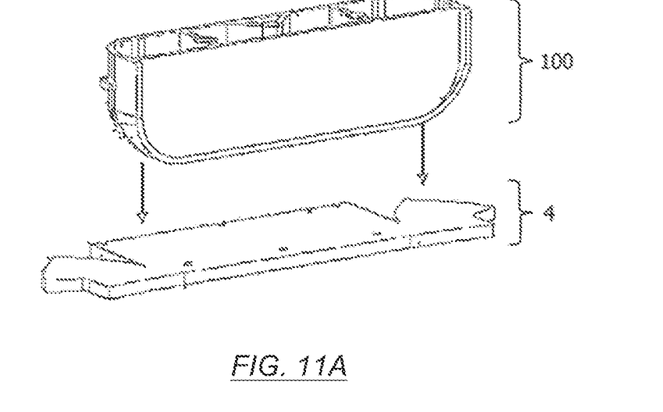
FIGS. 11A-11B show, schematically and in each case in an isometric view, a further method step for producing the cover according to the invention, wherein, in said further method step, a pressing punch is dressed with a provided (at least substantially flat) sound absorption material.
Figure 11B:
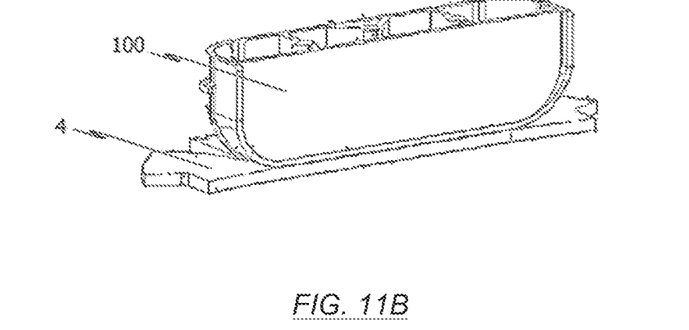

As illustrated schematically in FIG. 11A and FIG. 11B, it is provided, in the exemplary embodiment of this production method, that, for applying and/or fixing the sound absorption material 4 to the inner surface of the housing 9, first of all the sound absorption material 4 is provided in an at least substantially flat form, wherein the outline of the sound absorption material 4 provided corresponds to the network of the regions of the inner surface of the housing 9 that are to be covered by the sound absorption material 4.

As is shown schematically in particular in FIG. 11A and FIG. 11B, a pressing punch 100 is subsequently dressed with the (substantially flat) sound absorption material 4 provided, wherein, for dressing the pressing punch 100, the (substantially flat) sound absorption material 4 provided is placed at least regionally on an end surface of the pressing punch 100 and is temporarily fixed there.

It is provided in particular here that the pressing punch 100 has an end surface which is preferably matched to the size and/or shaping of the wall regions 3 of the housing 9 of the cover 1, said wall region serving as lid region.

Figure 10:
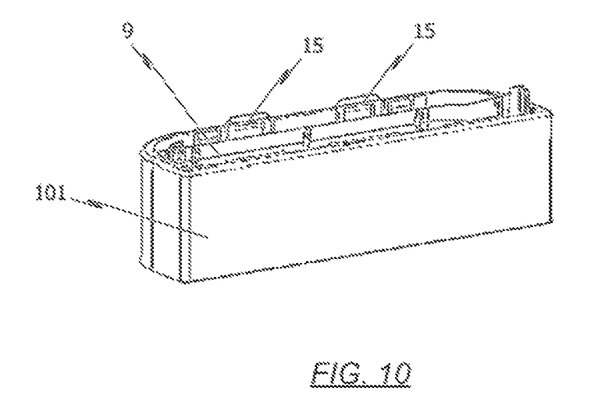
FIG. 10 shows, schematically and in an isometric view, the housing of the cover that is placed in the die-like device.

After appropriate dressing of the pressing punch 100 (cf. FIG. 11B), the pressing punch 100 dressed in this manner is introduced into the provided housing 9 of the cover 1. It is illustrated schematically in FIG. 10 how the housing 9 of the cover 1 is provided in the die-like device 101.

Figure 12A:
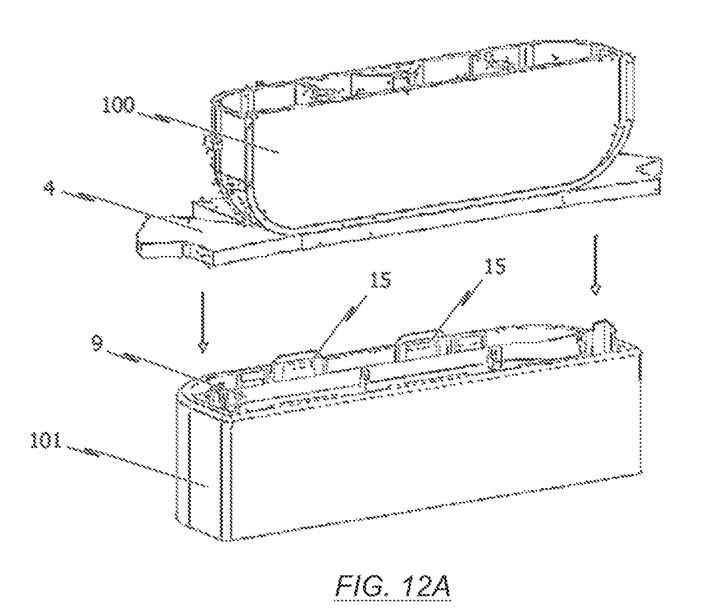
FIGS. 12A-12C show, schematically and in each case in an isometric view, a further method step for producing the cover according to the invention, wherein, in said further method step, the previously dressed pressing punch is introduced into the housing of the cover that is held in the die-like device.
Figure 12B:
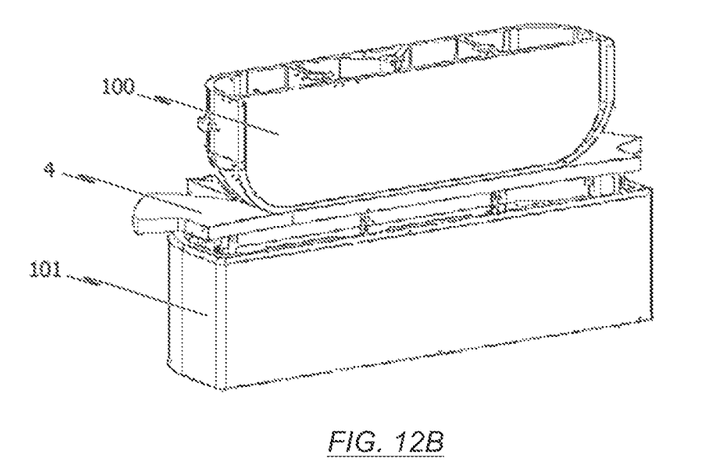
Figure 12C:
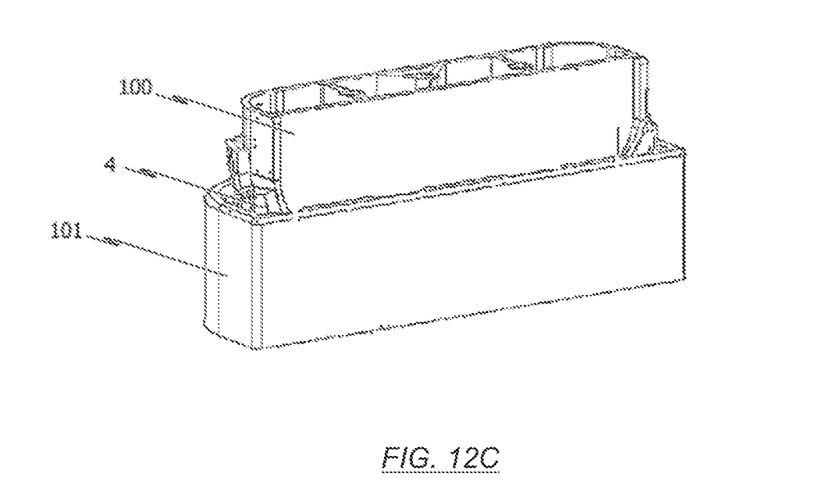

On the other hand, FIG. 12A to FIG. 12C schematically show the introduction of the dressed pressing punch 100 into the correspondingly provided housing 9 of the cover 1.

Accordingly, the dressed pressing punch 100 is introduced into the provided housing 9 of the cover 1 in such a manner that the sound absorption material 4 placed at least regionally on the end surface of the pressing punch 100 is deformed at least partially or regionally and lies at least regionally against the inner surface of the housing 9.

Figure 13:
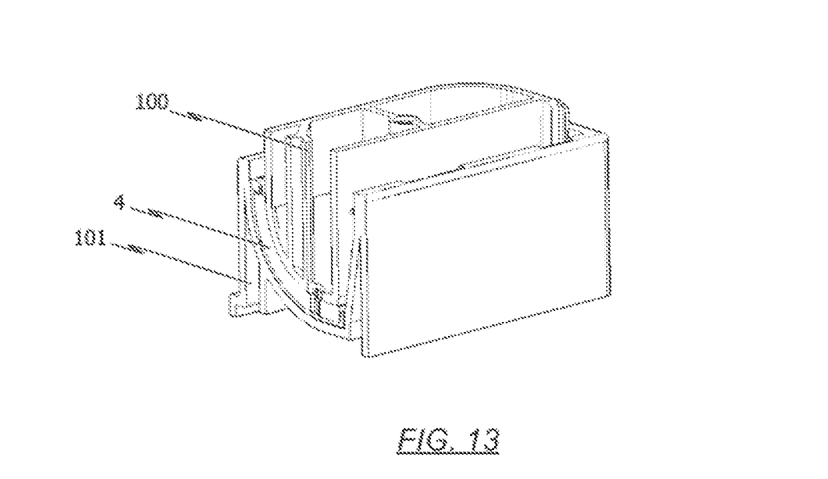
FIG. 13 shows, schematically and in an isometric partially sectioned view, the dressed pressing punch in its state introduced into the housing of the cover that is held in the die-like device.

As shown schematically and in a partially sectioned illustration in FIG. 13, when the dressed pressing punch 100 is introduced into the provided housing 9 of the cover 1, the at least partially or regionally deformed sound absorption material 4 is fixed at least regionally to the inner surface of the housing 9.

In the subsequent method step (cf. FIG. 14), the pressing punch 100 is withdrawn from the die-like device 101 in which the housing 9 of the cover 1 is placed.

Figure 14:
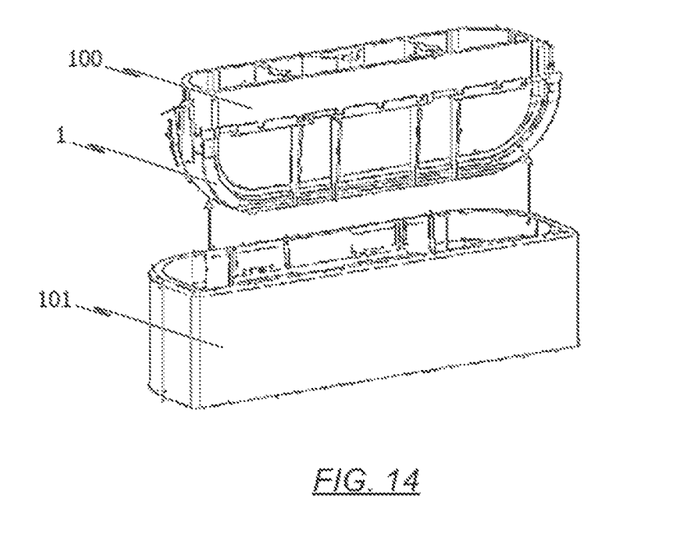
FIG. 14 shows, schematically and in an isometric view, a further method step for producing the cover according to the invention, wherein, in this further method step, the pressing punch together with the housing of the cover and the sound absorption material fixed to the housing of the cover is withdrawn from the die-like device.

Specifically, it is in particular provided here that the pressing punch 100 is dressed with the sound absorption material 4 provided, and, with the introduction of the dressed pressing punch 100 into the housing 9 of the cover 1 that is provided in the die-like device 101, the at least partially or regionally deformed sound absorption material 4 is fixed at least regionally to the inner surface of the housing 9, in such a way that, with the withdrawal of the pressing punch 100 from the die-like device 101, the housing 9 of the cover 1 with the at least partially or regionally deformed sound adsorption material 4, which is fixed at least regionally to the inner surface of the housing 9, is, together with the pressing punch 100, withdrawn from the die-like device 101.

Figure 15:
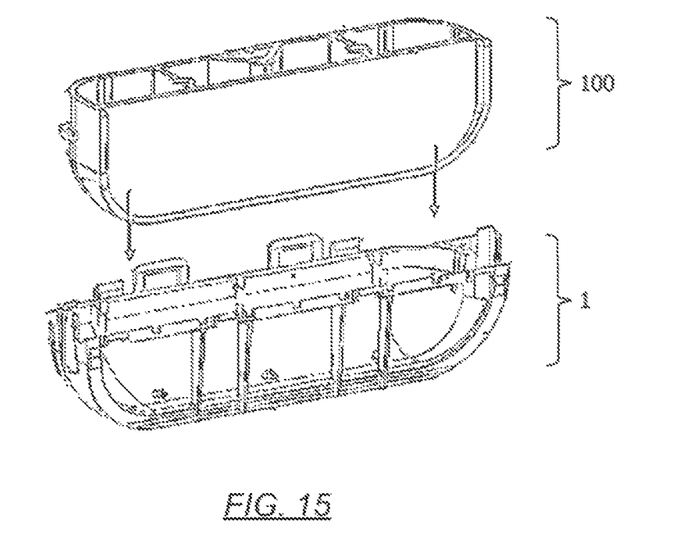
FIG. 15 shows, schematically and in an isometric view, a further method step for producing the cover according to the invention, wherein, in said further method step, the pressing punch withdrawn from the die-like device is separated from the housing of the cover and from the sound absorption material fixed to the housing of the cover.

Subsequently, as is shown schematically in FIG. 15, the pressing punch 100 can be separated from the manufactured and in particular sound isolated housing 9.

The invention relates not only to a cover 1 for a pressure-limiting valve of the type described previously and to a corresponding production method therefore, but also to a pressure-limiting valve arrangement for vehicles, wherein the pressure-limiting valve arrangement has at least one ventilation grille with at least one valve flap held in a frame, and has a cover 1 of the previously described type, wherein, as illustrated for example in FIG. 2 or FIG. 6, the cover 1 is present in its state of use. The cover 1 is connected or connectable here to the ventilation grille, preferably via at least one corresponding latching connection 15 via at least one side wall 2a, 2b, 2c.

LIST OF REFERENCE SIGNS

1 Cover
2a-c Side wall
3 Wall region serving as a lid region
4 Sound absorption material
5 Snap-action and/or latching connection element
6 Web
7 Hinge
8 Notch in the nonwoven material
9 Housing of the cover
15 Snap-action and/or latching connection element
10 Cover (Prior Art)
20a-c Side wall (Prior Art)
30 Wall region serving as a lid region (Prior Art)
50 Snap-action and/or latching connection element (Prior Art)
100 Pressing punch
101 Die-like device

What is claimed is:

1. A cover for a pressure-limiting valve arrangement of a vehicle, comprising:

at least one side wall including has a wall region serving as a lid region of the cover, wherein the cover is transferable from a state of manufacture into a state of use, wherein, in the state of manufacture, the at least one side wall and the wall region serving as a lid region are situated at least substantially and/or at least regionally in a common plane, and wherein, in the state of use, the at least one side wall and the wall region serving as a lid region are situated in mutually different planes;

wherein the at least one side wall and the wall region serving as a lid region each have a first surface, which, in the state of manufacture of the cover, face in a common direction, that points perpendicularly to the common plane, and which, in the state of use of the cover, at least regionally form an inner surface of a silencer space, wherein a sound absorption material is arranged at least regionally on the first surface of the at least one side wall and/or on the first surface of the wall region serving as a lid region.

2. The cover as claimed in claim 1,
wherein, in the state of use, the at least one side wall and the wall region serving as a lid region at least regionally delimit a three-dimensional silencer space.

3. The cover as claimed in claim 1,
wherein the sound absorption material is connected to the first surface of the at least one side wall, and/or to the first surface of the wall region serving as a lid region, via at least one materially bonded, form-fitting and/or force-fitting connection.

4. The cover as claimed in claim 3,
wherein, for the purpose of at least temporarily fixing the sound absorption material, at least one connection element, serving as a snap-action and/or latching connection element, is provided on the first surface of the at least one side wall and/or on the first surface of the wall region serving as a lid region.

5. The cover as claimed in claim 1,
wherein a partition formed via at least one web which is formed integrally with the material of the at least one side wall and/or of the wall region serving as a lid region is formed on a surface opposite the first surface of the at least one side wall and/or on a surface opposite the first surface of the wall region serving as a lid region.

6. The cover as claimed in claim 1,
wherein the at least one side wall is articulately connected to the wall region serving as a lid region via at least one film hinge.

7. The cover as claimed in claim 6,
wherein the at least one side wall, the at least one film hinge and the wall region serving as a lid region are formed integrally, during a plastic injection-molding process.

8. The cover as claimed in claim 1,
wherein the at least one side wall comprises at least two side walls, wherein each side wall of the at least two side walls is, in each case via a connecting edge region, articulately connected to a connecting edge region of the wall region serving as a lid region, wherein, a first side wall of the at least two side walls, which includes a first edge region on which at least one first snap-action or latching element is formed, wherein, in the state of use of the cover, the first edge region directly adjoins a second edge region of a second side wall of the at least two side walls, wherein the at least one first snap-action or latching element is formed at least regionally in a manner complimentary to a second snap-action or latching element formed on the second edge region wherein the second edge region, in the state of use of the cover, directly adjoins the first edge region.

9. The cover as claimed in claim 1,
wherein, an edge region of the at least one side wall faces in a direction away from the wall region serving as a lid region, the edge region has at least one snap-action and/or latching element formed thereon for a connection of the cover to the pressure-limiting valve arrangement.

\* \* \* \* \*